Jan. 26, 1965 W. A. LEE 3,167,197
BIN DUMPER
Filed Dec. 28, 1962 2 Sheets-Sheet 1
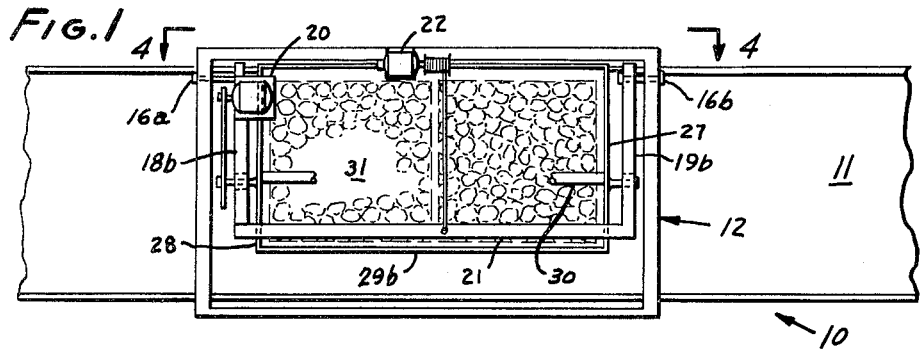
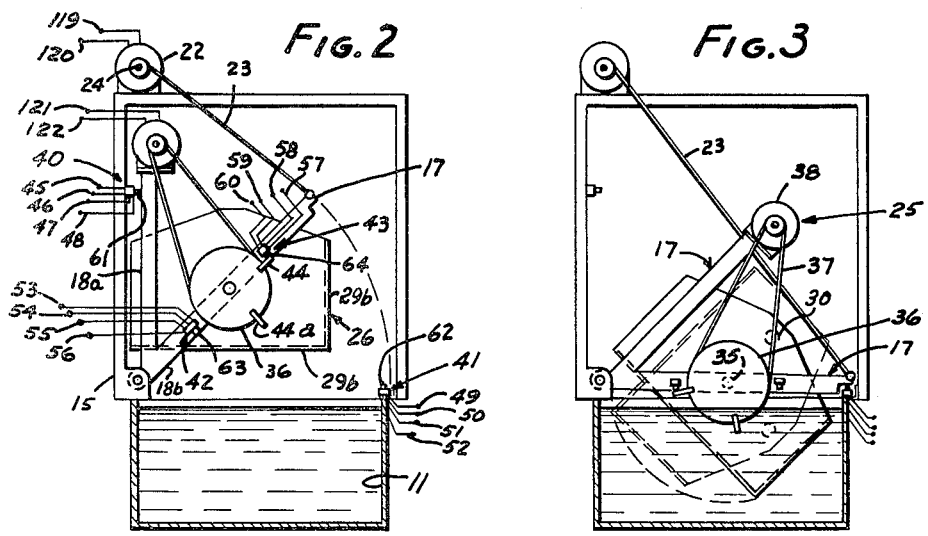
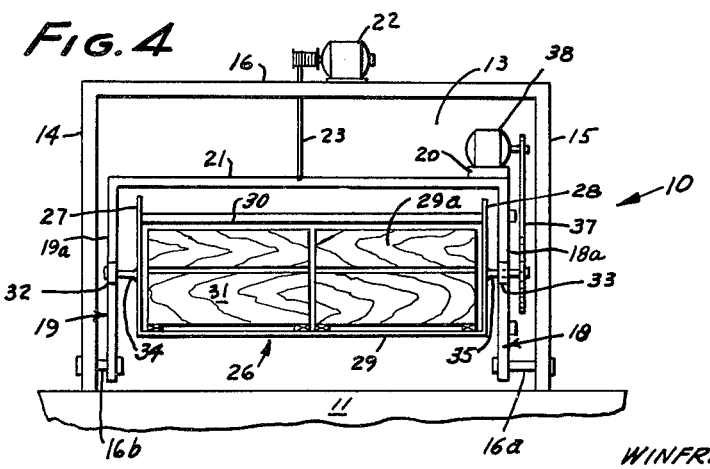
INVENTOR.
WINFRED A. LEE
BY *Angus & Mon*
ATTORNEYS.

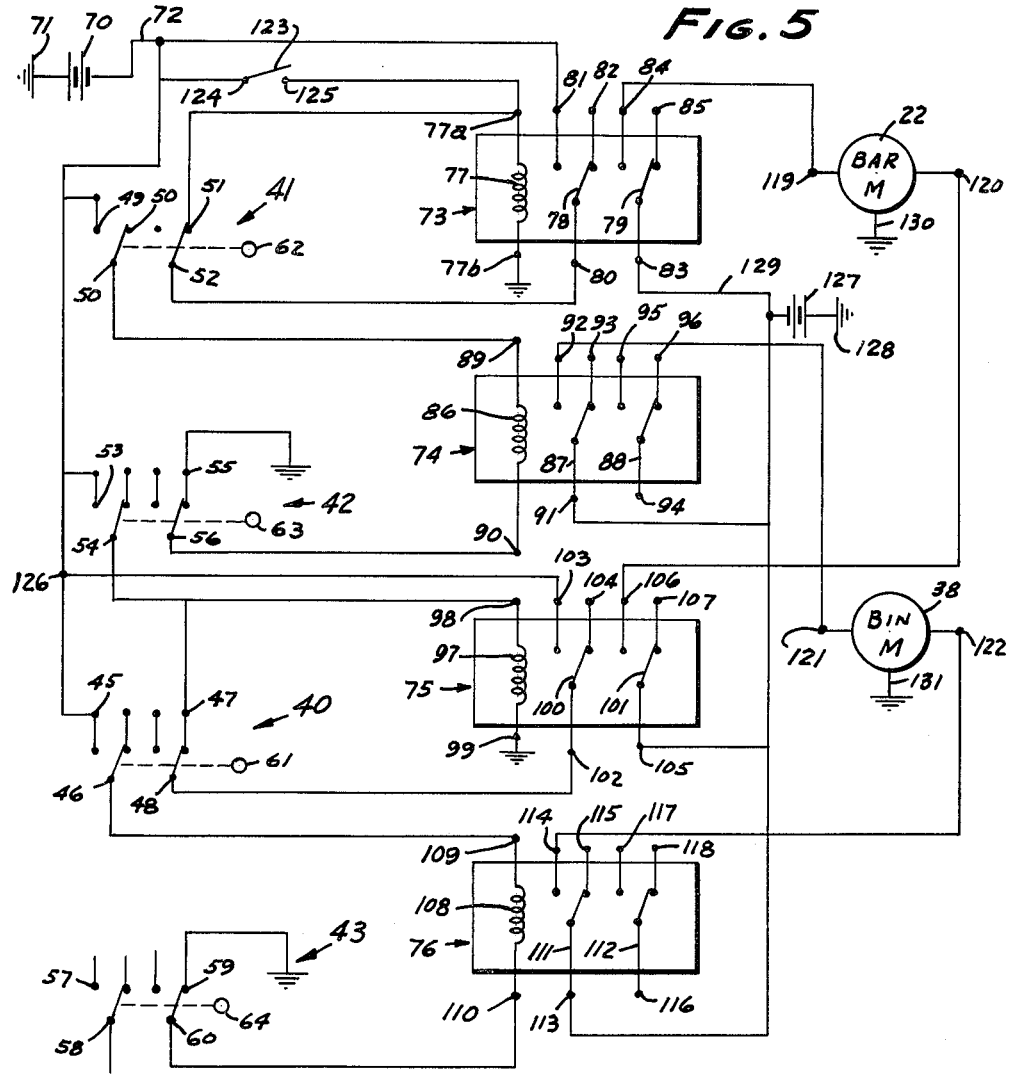

United States Patent Office 3,167,197
Patented Jan. 26, 1965

3,167,197
BIN DUMPER
Winfred A. Lee, La Habra, Calif., assignor to Fruit Equipment Service, Redlands, Calif., a corporation of California
Filed Dec. 28, 1962, Ser. No. 247,943
6 Claims. (Cl. 214—313)

This invention relates to a bin dumper, and in particular to a bin dumper which is able to receive bins and gently discharge their contents into a flume.

Particularly in the mass handling of certain types of fruit, pears for example, it is convenient to collect the fruit in the orchard in large field bins. However, this type of fruit bruises easily, and the task of unloading the bins either by hand or by conventional machinery largely offsets the advantages of bin handling by costs of labor or of damage to the fruit. Because this fruit bruises easily, it is not readily dumped in the same manner as citrus fruit, for example, so that existing bin dumpers have not been suitable. There is therefore a need in the market for a bin dumper for handling easily bruised objects such as pears, which will enable them expeditiously to be unloaded, and the packing sheds and orchards to enjoy the optimum advantages of handling the objects in field bins. It is an object of this invention to provide such a bin dumper, and, furthermore, to provide it with a control which can render the dumper action completely automatic.

A bin dumper according to this invention includes a frame having a side with a port for receiving a bin. Within and adjacent to the port, there is a lift means adapted to lower the bin toward a flume which is filled with water. A tilt means is supported on the lift means so that the bin can be tilted when the lift means is in a lower position, thereby gently to dump the fruit into the flume.

According to a preferred but optional feature of the invention, an automatic control is provided which sequences the operation of the device first by lowering the lift means, then tilting the tilt means, next retracting the lift means, and then returning the tilt means to the horizontal to permit the empty bin to be discharged and to receive a filled bin to be dumped.

The above and other features of this invention will be fully understood from the following detailed description and the accompanying drawings in which:

FIG. 1 is a top view of the presently preferred embodiment of the invention;

FIGS. 2 and 3 are side elevations of the device shown in three sequential positions of its operation;

FIG. 4 is a side view of FIG. 1 taken at line 4—4 thereof; and

FIG. 5 is a diagram of a circuit suitable for controlling the structure of FIGS. 1–4.

A bin dumper 10 according to the invention is shown in FIG. 1. The device includes a flume 11 filled with water preferably flowing in one direction or the other to float or wash away the objects which are dumped thereinto. Atop the flume, there is mounted a frame 12 which has a port 13 in one of its sides. As can best be seen in FIG. 4, port 13 is preferably formed by simply leaving the side open. The frame includes a pair of uprights 14, 15 and a crosstie 16. Other structural elements may be provided to square off and make the frame more rigid as shown in the drawings.

Hinge pins 16a, 16b, at the base of the frame support a lift boom 17 (sometimes called "lift means"), which lift boom includes a pair of side arms 18, 19 near and inside the side uprights. The side arms are hinged by pins 16a and 16b. Arms 18 and 19 are bifurcated, branches 18a and 19a rising from lower branches 18b and 19b. The upper branches are joined by a cross bar 21, which mounts a motor support 20, which motor support moves with the side arms, and thus with the boom.

A bi-directional electrical lift motor 22 (sometimes called "first power means") is mounted to crosstie 16. A lift cable 23 or chain is wound to the motor shaft 24, and the free end is fixed to crossbar 21 so that operation of the motor in one direction lifts the lift boom, and operation in the opposite direction lowers it.

Bin tilt means 25 is mounted to the lift boom. This means comprises a bin holder 26 having a pair of side plates 27, 28 joined by a bottom plate 29. One side forms an open port 29a aligned with port 13. The other side has a bar 29b between the side plates to keep the bin from falling out when tilted. A bin hold-down rod 30 extends between and ties together the upper ends of side plates 27 and 28. As best shown in FIG. 4, a bin 31 can be introduced through ports 13 and 29a and placed on bottom plate 29 by a fork lift.

Journals 32, 33 mount shafts 34, 35 on side plates 27, 28 revolubly to support the bin holder. A sprocket 36 is pinned to shaft 35 and joined by chain 37 to a bi-directional electrical tilt motor 38 (sometimes called "second power means") which is mounted on motor support 20. As can be seen in FIG. 3, operation of the motor in one direction or the other will tilt the bin holder in the respective direction.

Boom up-limit switch 40 is mounted to upright 15. Boom down-limit switch 41 is mounted near the base of the frame. Bin tilted limit switch 42 is mounted to side arm 18. Bin level limit switch 43 is similarly mounted to side arm 18. Dogs 44 and 44a are mounted to sprocket 36 where they can contact and trip limit switches 43 and 42, respectively, at the respective limits of travel. The boom itself strikes limit switches 40 and 41.

Leads 45, 46, 47, 48 connect to limit switch 40. Leads 49, 50, 51, 52 connect to limit switch 41. Leads 53, 54, 55, 56 connect to limit switch 42. Leads 57, 58, 59, 60 connect to limit switch 43.

Limit switches 40, 41, 42 and 43 have actuators 61, 62, 63, 64, respectively, which may be buttons adapted to be contacted by the side arm or the dog.

The operation of the device is shown in FIGS. 1–4. A bin is first inserted through port 13 to the position shown in FIGS. 2 and 4. The lift boom will then lower the device to the position shown in FIG. 3, with the bin holder in the position shown in solid line. Bar 29b and hold-down rod 30 keep the bin from falling out of the bin holder.

The tilt motor is next actuated to rotate the bin holder to the position shown in dashed line, and the fruit will gradually fall out into the flume during the tilting movement. The lift motor next pulls the lift boom back up to the boom position shown in FIG. 2, and then the tilt motor turns the bin back to the bin position shown in FIG. 2, at which time the empty bin can be removed, and a full bin placed in the bin holder to be dumped.

This dumper can be entirely automated, and a fork lift operator can operate more than one of these bin dumpers at the same time, and unloading and reloading one while another is in operation. It is obvious that an automatic circuit would be convenient for a device such as this, and one is shown in FIG. 5, this being an example of only the most suitable of a number of useful circuits for cycling the bin dumper.

The circuit in FIG. 5 is shown as a typical single-wire control circuit adapted to actuate pilot relays for applying heavy currents to the motors. The electrical motor is preferably the type provided with brakes of one type or another to hold the motor in the position where it stops, the brake being released when the motor is operated. A current and voltage source 70 for the control actuation is schematically illustrated as a battery or line connection, with a ground 71 at one side and a bus 72 at the other. Current from source 70 is used to energize relays 73, 74, 75, 76 in accordance with signals derived from the limit switches.

Relay 73 includes an actuating coil 77 with terminals 77a and 77b, and a pair of switches 78, 79. Switch 78 includes a common terminal 80 and two switching terminals 81, 82. Switch 79 includes a common terminal 83 and switching terminals 84, 85.

All the relays are shown in their unactuated, de-energized condition, with their switch blades making contact as illustrated. For example, in switches 78 and 79, the common terminals 80 and 83 are connected to switching terminals 82 and 85, respectively. Were a current passed through coil 77, the switches would switch over so that the common terminals 80 and 83 would then be connected to switching terminals 81 and 84 instead. When de-energized, the condition would again revert to that shown in the drawings.

Relay 74 includes an actuating coil 86 and two switches 87, 88. Coil 86 has terminals 89, 90. Switch 87 has a common terminal 91 and two switching terminals 92, 93. Switch 88 has a common terminal 94 and two switching terminals 95, 96.

Relay 75 includes an actuating coil 97 which has terminals 98, 99. The relay also includes switches 100, 101. Switch 100 includes a common terminal 102 and switching terminals 103, 104. Switch 101 has a common terminal 105 and switching terminals 106, 107.

Relay 76 includes an actuating coil 108 having terminals 109, 110. The relay includes switches 111, 112. Switch 111 includes common terminal 113 and switching terminals 114, 115. Switch 112 includes common terminal 116 and switching terminals 117, 118.

Lift motor 22 includes terminals 119, 120 and a ground. Tilt motor 38 has terminals 121, 122 and a ground.

The limit switches are shown in their uncontacted, repose condition. When the respective dog or side arm strikes the actuator of the limit switch, the condition of the switches will be reversed. Thus, as in switch 41, which in the unactuated condition makes no contact between terminals 49 and 50 and does make a circuit between terminals 51 and 52, the situation would be reversed on contact of the side arm with actuator 62 which would connect terminals 49 and 50 and disconnect terminals 51 and 52. Similar operation pertains to limit switches 40, 42 and 43.

A starter switch 123 has terminals 124, 125.

Bus 72 is connected to switching terminal 81 of switch 78, to terminal 124 of the starter switch, and to terminals 49, 53 and 45 of limit switches 41, 42 and 40, respectively. Terminal 125 of the starter switch is connected to terminal 77a of coil 77 and to terminal 51 of switch 41. Terminal 77b is connected to ground.

A captive circuit is formed by connection of bus 72 to terminal 81 and from terminal 80 of relay 73 to terminal 52 of switch 41. Terminal 50 of limit switch 41 is connected to terminal 89 of coil 86. Terminal 90 of coil 86 is connected to terminal 56 of switch 42, and terminal 55 is connected to ground. Terminal 54 is connected to terminal 47 of switch 40 and to terminal 98 of coil 97. Terminal 99 is grounded.

Another captive circuit is formed by connection between bus 72 at terminal 126 and terminal 103 of switch 100. Terminal 102 is connected to terminal 48 of switch 40. Terminal 46 of switch 40 is connected to terminal 109 of coil 108. Terminal 110 of coil 108 is connected to terminal 60 of limit switch 43. Terminal 59 of limit switch 43 is grounded.

The aforesaid constitutes the control portion of the circuit. The power portion of the circuit is derived from a power source 127, one side of which is grounded at 128. This connects to a power bus 129. Bus 129 connects to terminal 113 of switch 111, to terminal 105 of switch 101, to terminal 91 of switch 87, and to terminal 83 of switch 79. Terminal 84 of switch 79 connects to terminal 119 of motor 22, the motor being indicated as grounded at 130.

Application of power to terminal 119 causes the lift motor to lower the lift boom. Terminal 120 of motor 22 is connected to terminal 106. Application of power to terminal 120 causes the lift motor to turn in the opposite direction, causing the lift boom to go up.

Terminal 92 of switch 87 is connected to terminal 121 of tilt motor 38, which is indicated as grounded at 131. Application of power to terminal 121 causes the tilt motor to operate so as to tilt the bin toward the dashed line position of FIG. 3. Terminal 122 of motor 38 is connected to terminal 114 of switch 111. Application of potential to terminal 122 causes motor 38 to restore the bin to a level position as shown in solid line in FIGS. 2 and 3.

The operation of the circuit will now be described. With a fresh bin just loaded into the bin holder, the bin holder will be level so that limit switch 43 will be contacted and actuated, and the tilt boom will be up, thereby holding switch 40 closed. Limit switches 41 and 42 will be in their unactuated condition as illustrated. Switches 40 and 43 will be in the conditions opposite from those illustrated.

To begin a cycle, the start switch 123 is momentarily closed, applying potential to coil 77 and switching over switches 78 and 79. The circuit through switch 78 completes a captive circuit through terminals 81, 80, 52, 51, 77a, 77b to ground, thereby holding the relay closed. The starter switch can therefore be reopened without stopping the circuit. The circuit through switch 79 applies power from bus 129 through terminals 83, 84, 119 to operate motor 22 to lower the boom. This permits limit switch 40 to move to the position illustrated in FIG. 5. Operation of motor 22 continues with relay 73 locked in until the lift boom strikes limit switch 41, which breaks the captive circuit between terminals 51 and 52, de-actuating the relay and cutting off power to motor 22. This movement also closes the circuit between terminals 49 and 50 of limit switch 41, thereby applying current from lead 72 through coil 86, terminals 56, 55 and ground, thereby actuating relay 74.

Limit switch 41 will remain closed so long as the tilt boom remains in the lower position. This keeps relay 74 actuated, thereby applying power from bus 129 through terminals 91, 92, and 121 to operate the tilt motor to tilt the bin to the position shown in dashed line in FIG. 3. When this dashed-line position is reached, dog 44a will strike actuator 63 which will reverse the switching condition shown in FIG. 5. This will break the circuit between terminals 55 and 56 and de-actuate relay 74, thereby stopping motor 38.

This motion will also close the circuit between terminals 53 and 54 of limit switch 42, thereby applying potential to coil 98 and actuating relay 75.

This actuation creates a captive circuit from terminal 126 through terminals 103, 102, 48, 47, 98 and 99 to ground, holding relay 75 captive. It will be observed that limit switch 42 will remain actuated so long as the bin remains tilted. It does not become untilted in the cycle described until the lift boom again is in its uppermost condition. With relay 75 actuated, switch 101 is closed to make a circuit from bus 129 through terminals 105, 106, 120 to actuate bar motor 22 to lift the tilt boom. This operation will continue until limit switch 40 is actuated by contact of the side arm with actuator 61. This will break the captive circuit, but it will be noted that a circuit to coil 97 still remains through limit switch 42, the bin remaining tilted. However, as soon as limit switch 40 is actuated, a circuit is made through terminals 45 and 46 thereof, thence through terminals 109 and 110 of coil 108, and thence through leads 60 and 59 of limit switch 43. This actuates relay 76, making a circuit from bus 129 through terminals 113, 114 and 122 to operate the tilt motor in the opposite direction, thereby moving dog 44a off limit switch 42 and opening the circuit between terminals 53 and 54, thereby de-energizing relay 75. The two de-energizing actions, that of breaking the captive circuit and of opening limit switch 42, occur so closely together that there will be no damage to motor 22 even though it may be held on for an extra moment. If desired, the limit switches may be set to provide for some overtravel to avoid mechanical jamming.

The operation of motor 38 continues until dog 44 strikes actuator 65, thereby switching over limit switch 43 and breaking the circuit through coil 76, de-actuating the same. The automatic cycle has now been completed, and the emptied bin has been restored to its normal level position. The empty bin may now be removed and replaced by a full bin, and the cycle repeated by closing the starter switch momentarily.

It will thus be seen that this technique for dumping a bin comprises loading the bin onto the bin holder, lowering the bin toward the flume, which motion includes some initial tilting, but usually not enough to dump fruit out. Preferably, it moves the fruit about to its angle of repose in the bin. At some lower position, the gradual rotation of the bin is started to gradually dump the fruit into the flume. When the bin has been fully tilted, the lift boom is brought up, leaving the bin still tilted so that the last of the fruit will fall out. Then when the boom is restored to its uppermost position, the bin can be retilted to the level position. It will be understood that different sequences of operation, and different circuits for providing this and alternate cycles can be substituted for the one shown herein, which are still within the scope of the invention.

It will also be understood that different lift means could also be used, including pure vertical lifts, and still lie within the scope of the invention, but the device shown is advantageous in that both lowering and initial tilting are expeditiously obtained with relatively inexpensive and simple structure.

This invention provides a simple means for mass handling of fruit and other easily-bruised objects which is foolproof and which can withstand rough usage.

This invention is not to be limited by the embodiments shown in the drawings and described in the description which are given by way of example and not of limitation, but only in accordance with the scope of the appended claims.

I claim:

1. A bin dumper comprising: a flume; a frame above the flume; a lift boom hinged to the frame about a first axis so as tiltingly to move toward and away from the flume; first power means for moving the boom; a bin holder carried by the lift boom; tilt means for tilting the bin holder journaled to the boom, about a second axis which is parallel to the first axis; and second power means mounted to the boom for tilting the tilt means relative to the boom; the frame and bin holder having ports for admitting a bin to be dumped, whereby a full bin may be passed through the ports and placed in the bin holder, the lift boom lowered by the first power means toward the flume, the tilt means tilted by the second power means to dump the bin contents into the flume, and the lift boom and the tilt means lifted and tilted by their respective power means to restore the empty bin into its original position wherein the bin may be removed through the ports, and replaced with a full bin to be dumped.

2. A bin dumper according to claim 1 in which both power means comprise bi-directional motors and in which the first power means is mounted to the frame and actuates a cable to tiltably move the boom and in which the second power means actuates a sprocket and chain to tilt the bin holder.

3. A bin dumper according to claim 1 in which sequentially operating control means is provided for the two power means for sequentially operating the boom and tilt means.

4. A bin dumper according to claim 3 in which the bin holder comprises a bottom, a pair of sides and a bar above the bottom to restrain the bin from falling out when the tilt means is tilted.

5. A bin holder according to claim 4 in which a limit switch is mounted to the bin dumper to detect the extreme limits of motion of the lift boom and the tilt means for limiting said motion and actuating the control.

6. A bin dumper according to claim 5 in which the control comprises four relays under the control of said limit switches, there being four of said limit switches, the relays and limit switches being so disposed, arranged and interconnected as to operate and maintain individual ones of the said means in operation sequentially as a result of the controls being started, and of reaching the desired extremes of movement.

References Cited in the file of this patent

UNITED STATES PATENTS

| | | |
|---|---|---|
| 2,540,766 | Stilwell et al. | Feb. 6, 1951 |
| 2,707,060 | Nawman | Apr. 26, 1955 |
| 2,741,379 | Stryker | Apr. 10, 1956 |
| 2,851,178 | Rea et al. | Sept. 9, 1958 |
| 2,900,096 | Dempster et al. | Aug. 18, 1959 |
| 2,905,344 | Hostetler et al. | Sept. 22, 1959 |
| 3,039,631 | Baker | June 19, 1962 |
| 3,058,606 | Chalich et al. | Oct. 16, 1962 |